US012573126B2

(12) United States Patent
Pankratz et al.

(10) Patent No.: US 12,573,126 B2
(45) Date of Patent: Mar. 10, 2026

(54) SPLIT BOUNDING VOLUMES FOR INSTANCES

(71) Applicants: Advanced Micro Devices, Inc., Santa Clara, CA (US); ATI Technologies ULC, Markham (CA)

(72) Inventors: David William John Pankratz, Markham (CA); Christiaan Paul Gribble, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 244 days.

(21) Appl. No.: 18/332,584

(22) Filed: Jun. 9, 2023

(65) Prior Publication Data

US 2024/0412446 A1 Dec. 12, 2024

(51) Int. Cl.
*G06T 15/06* (2011.01)
*G06T 17/00* (2006.01)

(52) U.S. Cl.
CPC ............ *G06T 15/06* (2013.01); *G06T 17/005* (2013.01); *G06T 2210/21* (2013.01)

(58) Field of Classification Search
CPC .... G06T 15/06; G06T 17/005; G06T 2210/21
See application file for complete search history.

(56) References Cited

U.S. PATENT DOCUMENTS

| | | | |
|---|---|---|---|
| 2007/0024615 A1* | 2/2007 | Keller ..................... G06T 15/55 |
| | | | 345/421 |
| 2007/0182732 A1* | 8/2007 | Woop ...................... G06T 15/06 |
| | | | 345/419 |
| 2008/0158254 A1 | 7/2008 | Jiang |
| 2009/0167763 A1* | 7/2009 | Waechter ............... G06T 15/40 |
| | | | 345/426 |
| 2015/0154809 A1 | 6/2015 | Chen et al. |
| 2018/0033191 A1 | 2/2018 | Mendez et al. |
| 2020/0051314 A1 | 2/2020 | Laine et al. |
| 2021/0027520 A1 | 1/2021 | Story et al. |
| 2021/0201559 A1 | 7/2021 | Gruen |
| 2021/0342996 A1* | 11/2021 | Saleh ..................... G06F 9/5027 |
| 2021/0390756 A1* | 12/2021 | Muthler ............... G06T 17/005 |
| 2021/0390757 A1* | 12/2021 | Muthler ............... G06T 15/005 |
| 2022/0068008 A1* | 3/2022 | Livesley ................... G06T 1/60 |
| 2022/0068009 A1* | 3/2022 | Wald ......................... G06T 7/50 |
| 2022/0189096 A1 | 6/2022 | Wu et al. |
| 2023/0252718 A1* | 8/2023 | Fenney .................. G06T 15/06 |

(Continued)

OTHER PUBLICATIONS

Sjoholm, J., "Effectively Integrating RTX Ray Tracing into A Real-Time Rendering Engine", 10 pgs., Oct. 29, 2018, downloaded from https://developer.nvidia.com/blog/effectively-integrating-rtx-ray-tracing-real-time-rendering-engine/ on Dec. 2, 2020.

(Continued)

*Primary Examiner* — Daniel F Hajnik
*Assistant Examiner* — Adeel Bash
(74) *Attorney, Agent, or Firm* — Volpe Koenig

(57) ABSTRACT

A technique for performing ray tracing operations is provided. The technique includes detecting intersection of a ray with a split bounding volume of an instance of a bounding volume hierarchy; determining whether the split bounding volume meets an instance traversal limiting criterion; and continuing BVH traversal based on the determining.

20 Claims, 7 Drawing Sheets

(56)        References Cited

U.S. PATENT DOCUMENTS

| | | | |
|---|---|---|---|
| 2023/0419589 A1* | 12/2023 | Clark | .................... G06T 15/005 |
| 2024/0095993 A1* | 3/2024 | Muthler | ................ G06T 15/005 |
| 2024/0177401 A1* | 5/2024 | Fuller | .................... G06T 15/08 |
| 2024/0203034 A1 | 6/2024 | Pankratz et al. | |

OTHER PUBLICATIONS

Lefrancois, M.-K., "DX12 Raytracing tutorial—Part 1", downloaded from https://developer.nvidia.com/rtx/raytracing/dxr/dx12-raytracing-tutorial-part-1, on Dec. 9, 2022, 9 pgs.
Benthin, C., et. al., "Improved Two-Level BVHs using Partial Re-Braiding", HPG, '17, ACM, Jul. 2017, 8pgs.

* cited by examiner

100

Interconnect 112

Processor 102

Auxiliary Device(s) 106

Auxiliary Processor(s) 114

APD 116

IO Devices 117

Memory 104

Storage 108

402

404

Single bounding volume view 700(1)

Split bounding volume view 700(2)

800

SPLIT BOUNDING VOLUMES FOR INSTANCES

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for performing ray tracing operations is provided. The technique includes detecting intersection of a ray with a split bounding volume of an instance of a bounding volume hierarchy; determining whether the split bounding volume meets an instance traversal limiting criterion; and continuing BVH traversal based on the determining.

Figure 1:
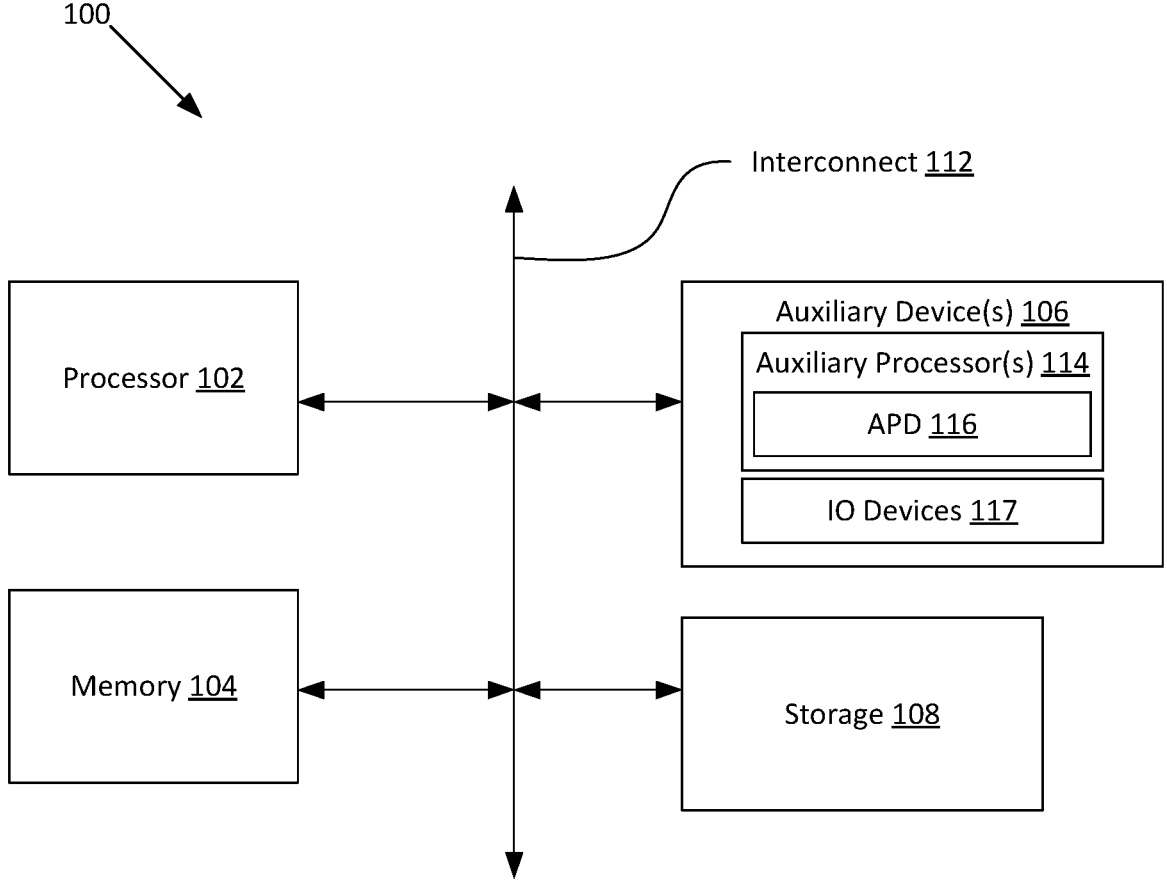
FIG. 1 is a block diagram of an example device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor or circuit.

The one or more auxiliary devices 106 includes an accelerated processing device ("APD") 116. The APD 116 may be coupled to a display device, which, in some examples, is a physical display device or a simulated device that uses a remote display protocol to show output. The APD 116 is configured to accept compute commands and/or graphics rendering commands from processor 102, to process those compute and graphics rendering commands, and, in some implementations, to provide pixel output to a display device for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and, optionally, configured to provide graphical output to a display device. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm perform the functionality described herein.

The one or more 10 devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

Figure 2:
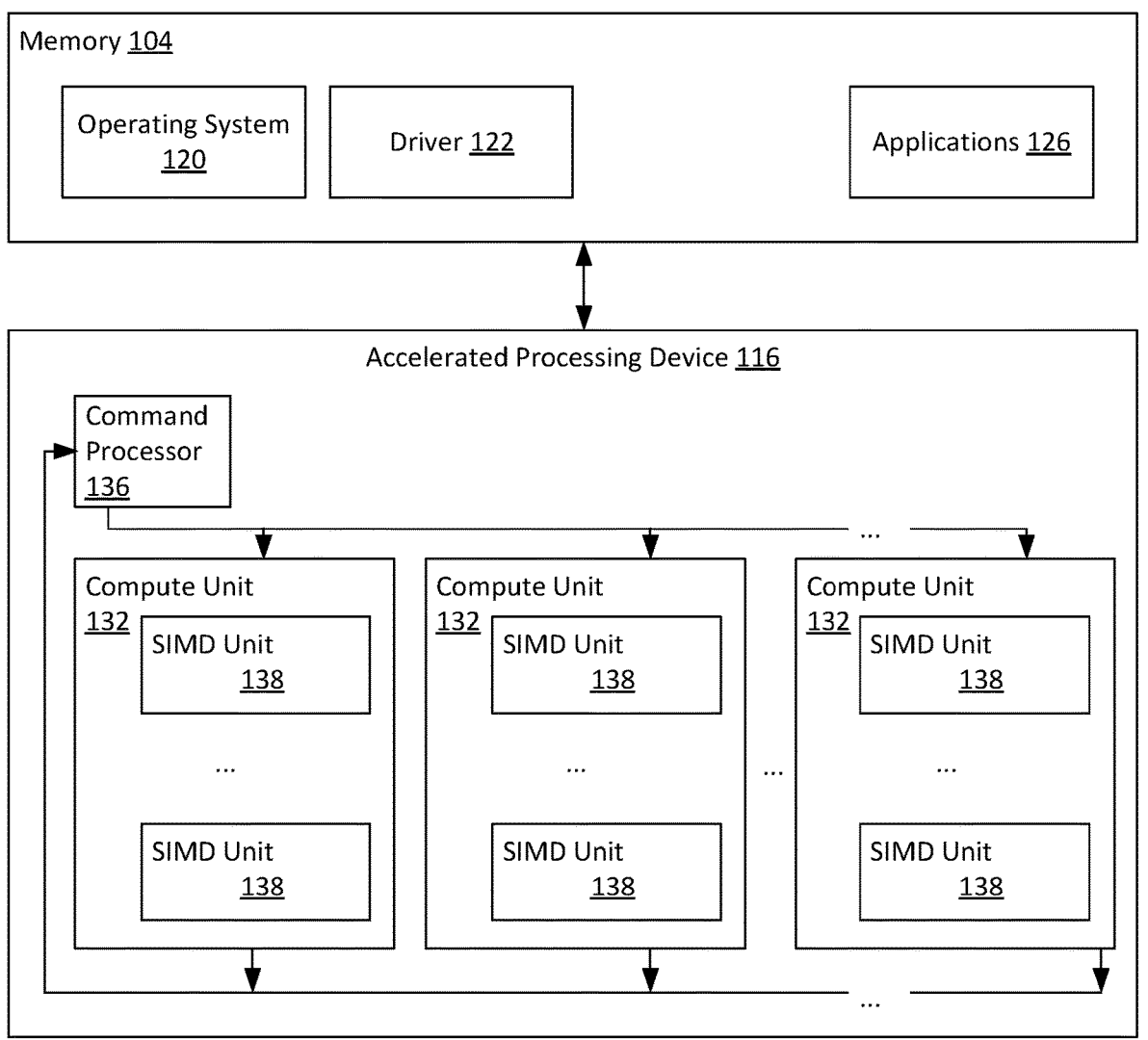
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to, e.g., a display device based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 36 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
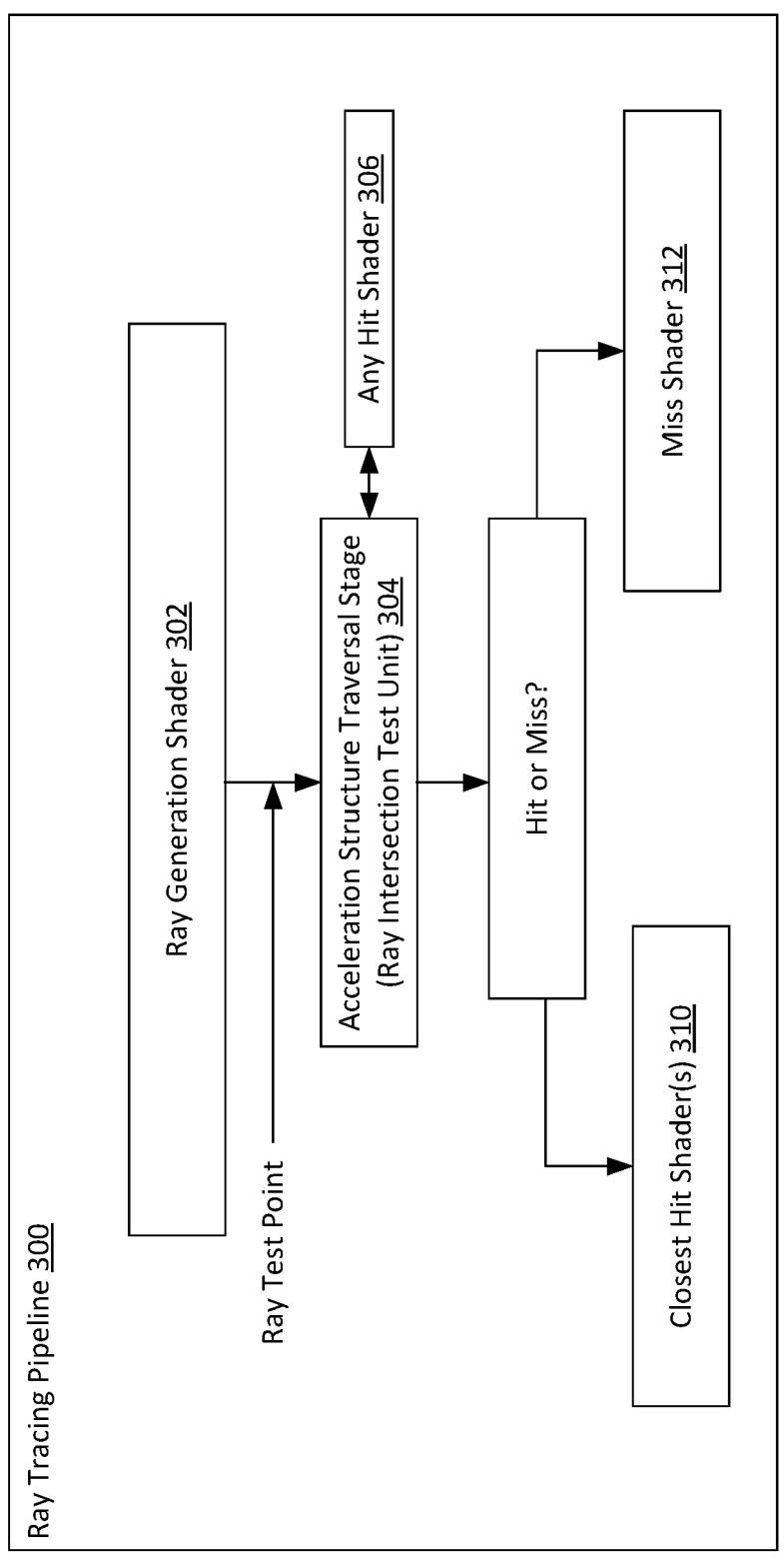
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122) or by code provided by some entity other than an application. The acceleration structure traversal stage 304 performs a ray intersection test to determine whether a ray hits a triangle.

The various programmable shader stages (ray generation shader 302, any hit shader 306, closest hit shader 310, and miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The ray tracing pipeline 300 may be orchestrated partially or fully in software or partially or fully in hardware, and may be orchestrated by the processor 102, the scheduler 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The acceleration structure traversal stage 304 determines whether the results of the acceleration structure traversal stage 304 (which may include raw data such as barycentric coordinates and a potential time to hit) actually indicates a hit. For non-opaque triangles that are hit, the ray tracing pipeline 300 may trigger execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. Regarding determining whether the results indicate a hit or a miss, the acceleration structure traversal stage 304 triggers execution of a closest hit shader 310 for the triangle closest to the origin of the ray that the ray hits, or, if no triangles were hit, triggers a miss shader 312.

Note, it is possible for the any hit shader 306 to "reject" a hit from the ray intersection test unit 304, and thus the acceleration structure traversal stage 304 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for the closest hit shader 310 or the miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves casting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent different axis aligned bounding boxes that subdivide the entire region. Each of those two children has two child nodes that represent axis aligned bounding boxes that subdivide the space of their parent, and so on. Leaf nodes represent a triangle against which a ray test can be performed. It should be understood that where a first node points to a second node, the first node is considered to be the parent of the second node.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
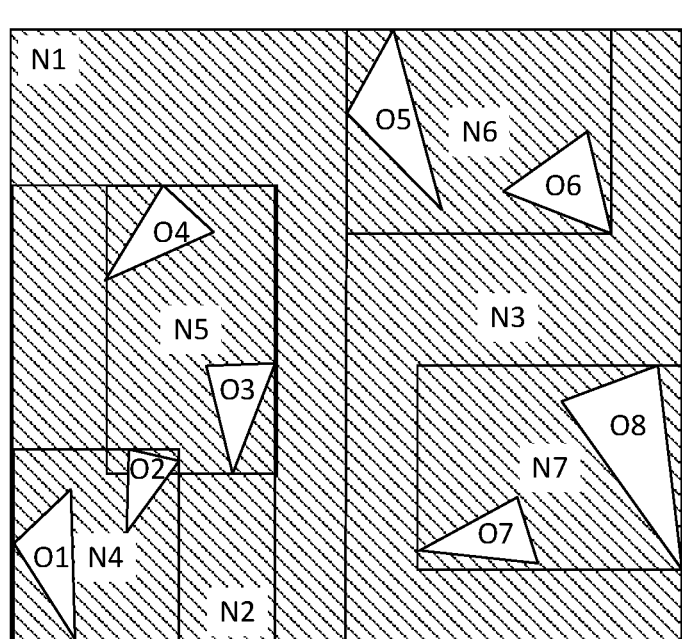
FIG. 4 is an illustration of a bounding volume hierarchy, according to an example.
Figure 4:
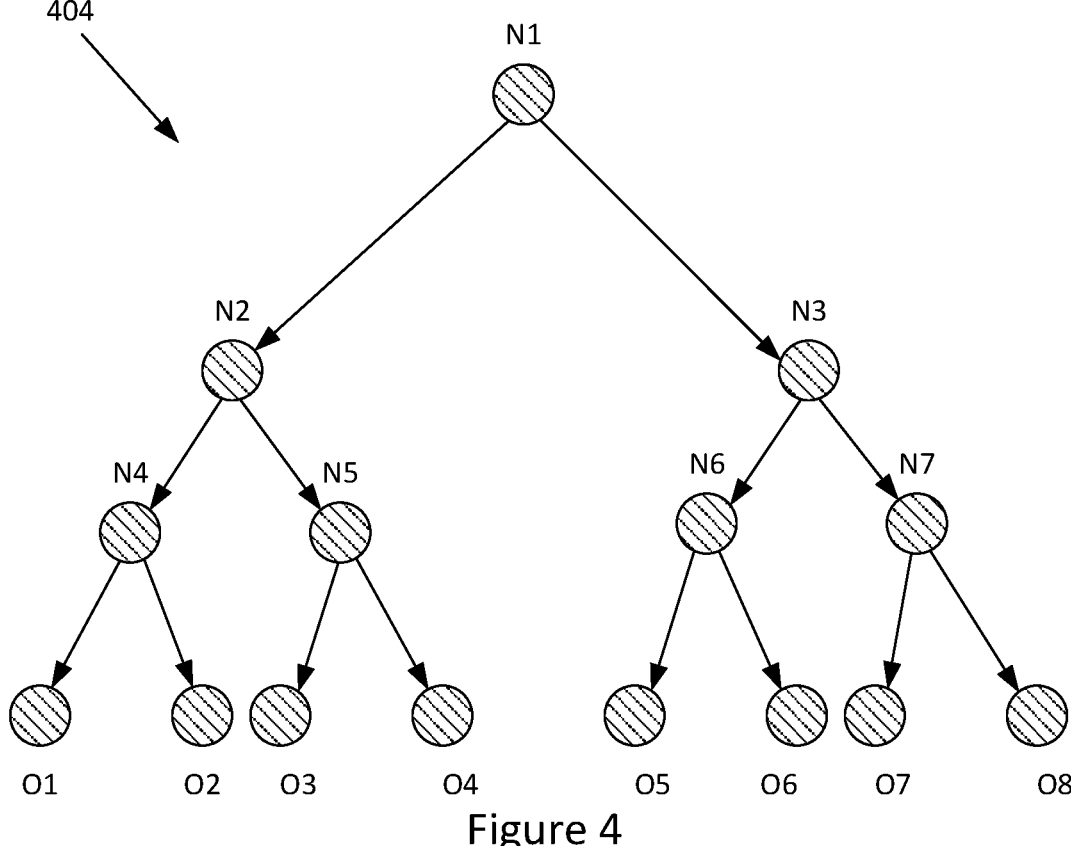

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the top of FIG. 4 and the tree representation 404 of the bounding volume hierarchy is illustrated in the bottom of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. In this example, the test would test against $N_2$, determining that the test fails. The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed. Note that rays can have a variety of directions and can have an origin in a variety of locations. Thus, the specific boxes eliminated or not eliminated would depend on the origin and direction of the rays. However, in general, testing the rays for intersection with boxes eliminates some leaf nodes from consideration.

Figure 5:
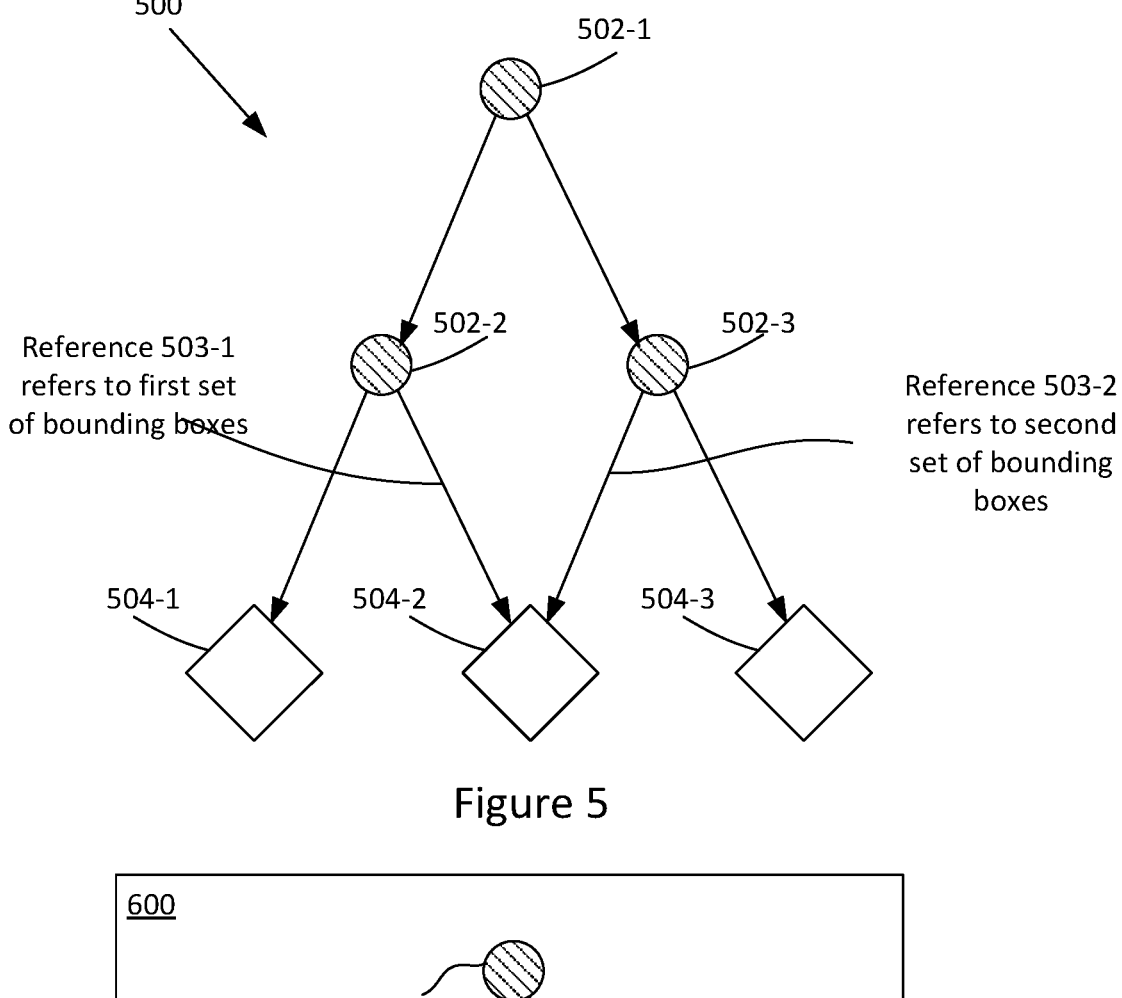
FIG. 5 illustrates a bounding volume hierarchy exhibiting a split bounding box for an instance node, according to an example.
Figure 6:
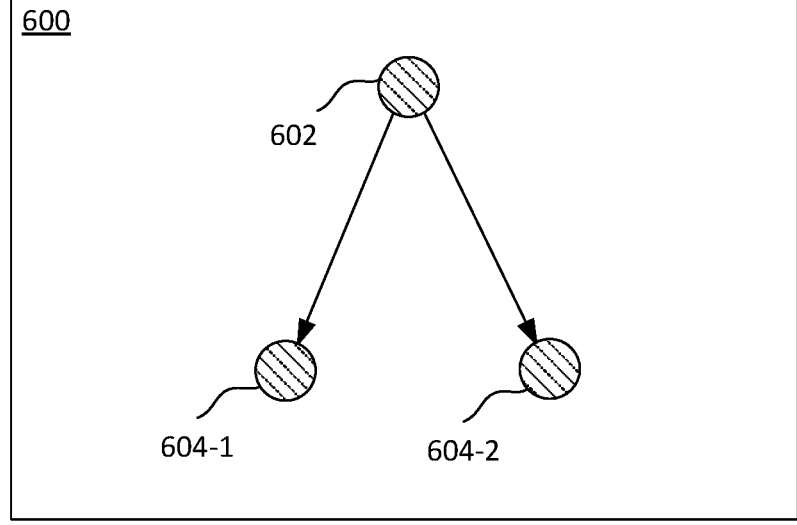
FIG. 6 illustrates an instance node, which is a portion of a BVH that is referenced by other portions of the BVH in a manner that allows duplication of scene objects in the BVH without requiring copying of such scene objects, according to an example.

FIG. 5 illustrates a bounding volume hierarchy 500 exhibiting a split bounding box for an instance node, according to an example. FIG. 6 illustrates a bottom level acceleration structure, which is a portion of a BVH that is referenced by an instance node in a manner that allows duplication of scene objects in the BVH without requiring copying of such scene objects, according to an example. FIGS. 5 and 6 will be described together.

In some examples, a BVH includes a top level BVH (e.g., BVH 500 of FIG. 5) and bottom-level BVHs (e.g., the BVH 600 of FIG. 6). A top-level BVH 500 includes non-leaf nodes 502 and instance nodes 504 that point to bottom-level BVHs 600. The bottom level BVH 600 includes non-leaf nodes 602 and leaf nodes 604. The non-leaf nodes 502 and non-leaf nodes 602 are similar to the non-leaf nodes N of the BVH 404 of FIG. 4. The leaf nodes 604 are similar to the leaf nodes O of the BVH 404 of FIG. 4 (e.g., the leaf nodes 604 include descriptions of underlying geometry for rendering—triangles or other primitives that represent actual content of a scene or object).

The instance nodes 504 include pointers to bottom-level BVHs 600. It is permitted for different instance nodes 504 to point to the same bottom-level BVH, which means that the geometry represented in the bottom-level BVH can be "duplicated" throughout the scene. Moreover, because the bottom-level BVH only needs to be stored once, the duplication does not require that the underlying data be represented by multiple copies.

To traverse a top level BVH with instance nodes, the ray tracing pipeline 300 traverses such a BVH until arriving at a reference to an instance node. Such a reference is associated with a bounding box that indicates whether or not to traverse to the instance node. If the ray intersects the bounding box, then the ray tracing pipeline 300 traverses to the instance node 504 because the ray may intersect underlying geometry of the referenced bottom level acceleration structure. If the ray does not intersect the bounding box, then the ray tracing pipeline 300 does not proceed to the instance node.

In the event that the ray tracing pipeline 300 traverses to an instance, the ray tracing pipeline 300 evaluates the ray against the non-leaf nodes 602 and leaf nodes 604 as described elsewhere herein. For example, the ray tracing pipeline 300 eliminates from consideration descendants of non-leaf nodes 602 for which the ray does not intersect a corresponding bounding box and traverses to descendants of non-leaf nodes 602 for which the ray does intersect a corresponding bounding box.

It is notable that the instance node 504-2 includes references from two different non-leaf nodes 502 of the BVH 500. This represents a split bounding volume. A split bounding volume is a bounding volume for which a single axis-aligned bounding box that bounds all geometry represented by descendants of an associated non-leaf node 502 has been split into multiple such bounding volumes. In some examples, the geometry specified by the leaf nodes of a bottom level acceleration structure 600 is referred to herein as "the underlying geometry of the bottom level acceleration structure 600" or with some similar phrase. Using multiple bounding volumes allows the bounding volumes to better conform to the underlying geometry, which reduces false positives and thus reduces the amount of unnecessary work to be performed. A false positive is an intersection of a ray with a bounding volume, where the ray does not intersect any leaf node geometry that descends from the non-leaf node associated with the bounding volume. In this situation, work has been done for the ray (testing the ray against non-leaf nodes/leaf nodes) that could have been prevented had it been known earlier that the ray did not intersect any underlying geometry. In addition to the above, better fit bounding boxes improves the fit of the parent non-leaf nodes of such better fit bounding boxes, and of the parents of those nodes, and so on, which improves performance for a large portion of the bounding volume hierarchy.

For the above reasons, it is possible to "split" a bounding volume such that multiple bounding volumes (e.g., multiple axis-aligned bounding boxes) are tested for intersection with a ray, rather than one large bounding volume. The multiple smaller bounding volumes are completely within the one large bounding volume which would otherwise be used for such a test. As with the non-leaf node tests described above, if the ray does not intersect any such bounding volume, then the ray tracing pipeline 300 does not proceed to test the ray against any nodes of the associated instance. If the ray intersects at least one such bounding volume, then the ray tracing pipeline 300 does proceed to traverse the instance.

In FIG. 5, non-leaf node 502-2 and non-leaf node 502-3 are each associated with one or more split bounding volumes. Each such non-leaf node 502 is associated with a different set of such split bounding volumes. Moreover, each such node points to the same instance node 504-2. A single large bounding volume bounds all geometry of the instance node 504-2. Moreover, the combination of bounding volumes associated with the references from non-leaf node 502-2 and 502-3 to the instance node 504-2 all fall within the single large bounding volume. In addition, the bounding volumes of this combination are "better fit" (contain less empty space, producing fewer false positives and improving the fit of "ancestors" of the bounding volumes) to the underlying geometry (the instance node 504-2) than the single larger bounding volume. Moreover, the total volume bounded by this combination bounds all underlying geometry of the instance.

Figure 7:
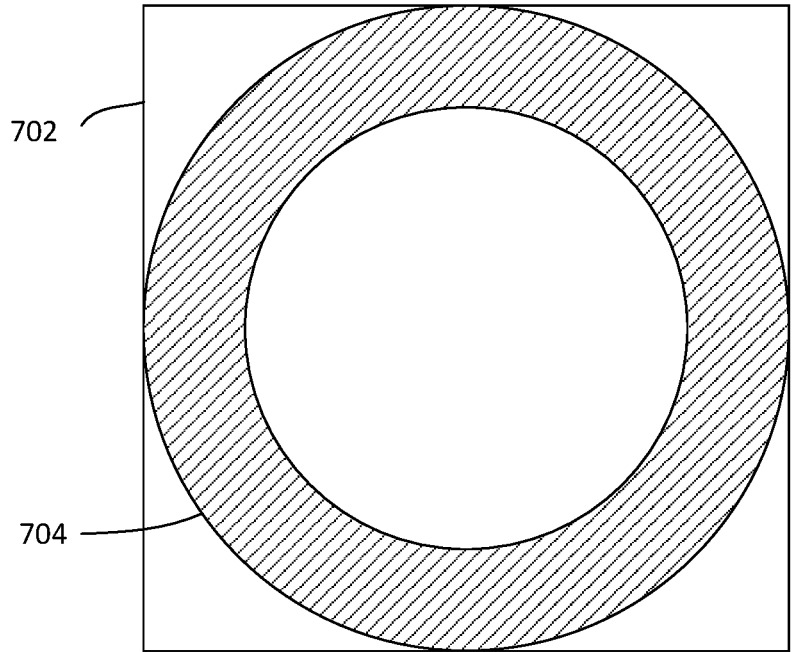
FIG. 7 illustrates a single bounding volume view and a split bounding volume view, according to an example.
Figure 7:
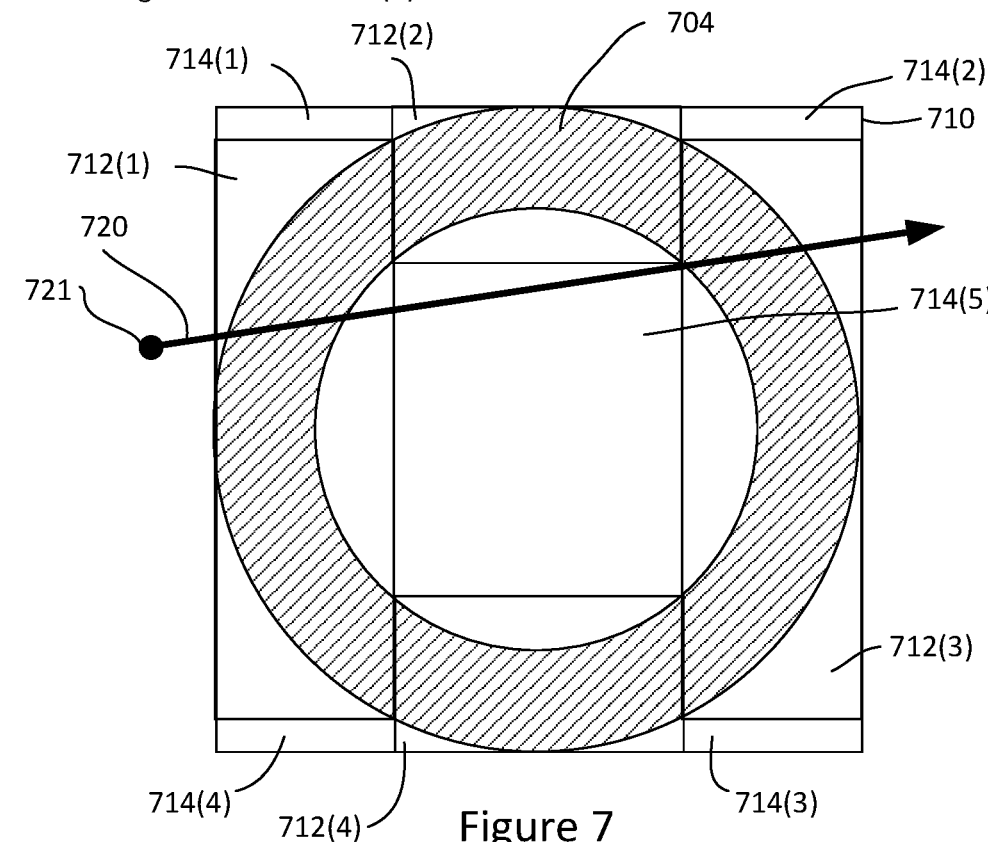

FIG. 7 illustrates a single bounding volume view 700(1) and a split bounding volume view 700(2), according to an example. The single bounding volume view 700(1) illustrates a single bounding volume 702 and underlying geometry 704, where the single bounding volume 702 bounds the underlying geometry 704. In some examples, the underlying geometry 704 represents the geometry specified by all leaf nodes that are included in the instance enclosed by the single bounding volume 702.

The split bounding volume view 700(2) illustrates split bounding volumes 712. The total volume occupied by the split bounding volumes 712 bounds all of the underlying geometry 704. Moreover, the amount of space occupied by the split bounding volumes 712 is less than the amount of space occupied by the single bounding volume 702/710, which reduces false positives.

In some examples, the split bounding volumes 712 are incorporated into a BVH by having multiple references of the BVH point to the same instance node. Each such reference includes one or more of the split bounding volumes. Thus, a plurality of such references is associated with all of the split bounding volumes for an instance node. By incorporating split bounding volumes into the BVH, the number of times that a false positive occurs is reduced.

Because entering an instance is often an expensive operation, reducing such false positives is beneficial.

The fact that there are multiple split bounding volumes is accommodated by including multiple references to the instance node in the BVH, where each such reference is associated with a different one of the split bounding volumes. A reference is data included within or associated with a non-leaf node, where the data indicates a bounding volume and a node to traverse to if a ray intersects that bounding volume (and that that node should not be traversed to if the ray does not intersect that bounding volume). Any non-leaf node 502 can include such a reference. A non-leaf node 502 can also include a reference to an instance node where the bounding volume of that reference is a split bounding volume (bounding only a portion, but not all, of the underlying geometry 704 of the instance). In addition, a single non-leaf node 502 can include two or more such references. In summary, it is possible to distribute the references for the split bounding volumes across one or more different non-leaf nodes.

Referring back to FIG. 5, it can be seen that there are multiple references 503 that point to the same instance node 504-2, which is associated with an instance. Each reference 503 includes a different set of one or more split bounding volumes, and refers to the instance node 504-2. In some examples, in the course of traversing the BVH 500, when the ray tracing pipeline 300 arrives at one such non-leaf node 502, the ray tracing pipeline 300 tests the ray against each of the split bounding volumes, and proceeds to the instance in the event that the ray intersects any such split bounding volume.

It is possible that traversal of a BVH for a single ray can lead to traversal into an instance multiple times. In an example traversal, the ray tracing pipeline 300 traverses to non-leaf node 502-2 for a ray, determines that the ray intersects a split bounding volume associated with a reference to the instance node 504-2, and thus traverses to the instance node. Continuing this example, it is possible that, for the same ray, the ray tracing pipeline traverses to non-leaf node 502-3, determines that the ray intersects a different split bounding volume associated with a reference to the instance node 504-2, and thus determines that traversal should continue to the instance node. However, some ray tracing application programming interfaces ("APIs") do not permit a single BVH traversal to visit the same instance more than one time. Thus, provided herein are techniques to limit traversal of an instance to a single time (or a limited number of times) in situations in which a BVH includes multiple references 503 to the same instance node 504 as described elsewhere herein.

Some clarification of terminology and concepts is now provided. The term "bottom level acceleration structure" or "bottom level bounding volume hierarchy" refers to a bounding volume hierarchy that can be used as an instance within an overall bounding volume hierarchy. FIG. 6 illustrates such a bottom level acceleration structure 600. The term "instance node" is a non-leaf node of the bounding hierarchy that includes a reference to a bottom level bounding volume hierarchy 600. The term "instance," without the word "node" refers to a single "instantiation" of a bottom level bounding volume hierarchy within the overall BVH. An instance includes both a reference to a bottom level bounding volume hierarchy and a transform, thus "placing" and "transforming" the geometry of the bottom level bounding volume hierarchy within the space represented by the overall bounding volume hierarchy. In this terminology, there is a one-to-one correspondence between instances and instance nodes. An instance node specifies an instance by specifying a combination of a bottom level bounding volume hierarchy and an instance transform. The bottom level acceleration structure is the information that allows for replication of a set of geometry without copying the specifics of that geometry. However, each "instance" also includes additional information—the instance transform—which indicates some additional information about how the geometry of the bottom level acceleration structure is to be copied or placed into a scene. Typically, an instance node includes both this instance transform information as well as a reference to a bottom level acceleration structure, such that each instance node provides sufficient information to represent an instance.

The present disclosure contemplates that there can be multiple references to a single instance. That is, the present disclosure contemplates that there can be multiple references to a single combination of bottom level acceleration structure and instance transform. This concept of multiple references is separate from the idea that each bottom level acceleration structure can be pointed to by different instance nodes, each with a different instance transform. More specifically, pointing to multiple instances means that different nodes of a BVH can point to the same instance, as defined both by a bottom level acceleration structure as well as an instance transform. This "multiple references" idea allows the bounding volume for the instance to be split, which allows for a better fitting total bounding volume for the instance, reducing false positives for that instance. By contrast, the idea that the same bottom-level acceleration structures can be referenced in multiple places in the BVH means that the geometry expressed by a bottom level acceleration structure can be copied through the scene represented by the bounding volume hierarchy. The conceptual difference between these two types of "multi-referencing" is understood with reference to FIG. 5. Specifically, the idea that the bounding volume can be split for an instance is reflected in the fact that multiple non-leaf nodes 502 can point to the same instance node, where that instance node defines a single instance as specified by the combination of a bottom-level acceleration structure and an instance transform. By contrast, reference to the same bottom-level acceleration structure in different places in the BVH would be reflected by multiple different instance nodes 504, each with their own instance transform, pointing to the same bottom-level acceleration structure, and thus specifying different instances.

Referring again to FIG. 7, a ray 720 is illustrated in relation to the split bounding volume view 700(2). As can be seen, the ray 720 intersects multiple split bounding volumes 712—split bounding volume 712(1) and split bounding volume 712(3) of an instance. To limit the number of times traversal to an instance occurs, the ray tracing pipeline 300 allows traversal of the instance for only a single split bounding volume 712 of the bounding volumes 712 along the path of the ray 720. By allowing traversal for only one split bounding volume 712 along the path of the ray, the ray tracing pipeline 300 follows the limits applied by the API.

In some examples, the specific split bounding volume that is chosen is based on an instance traversal limiting criterion. The ray tracing pipeline 300 traverses to the instance for the split bounding volume 712 that references the instance along the path of the ray 720 that meets the instance traversal limiting criterion and does not traverse to the instance for any split bounding volume 712 that references the instance along the path of the ray that does not meet the instance traversal limiting criterion.

Put in the context of a full BVH traversal for a ray, the ray tracing pipeline 300 traverses the BVH for the ray until the ray tracing pipeline encounters a non-leaf node with a reference to an instance node, where the reference is associated with a split bounding volume. In response to finding such a reference, the ray tracing pipeline 300 determines whether that split bounding volume meets the instance traversal limiting criterion. If the split bounding volume does meet that criterion, then the ray tracing pipeline 300 traverses to the instance. If the split bounding volume does meet that criterion, then the ray tracing pipeline 300 does not traverse to the instance. Regardless of whether the split bounding volume meets the criterion, the ray tracing pipeline 300 continues traversal of the BVH. In situations where the ray intersects multiple split bounding volumes for the same instance, the ray tracing pipeline 300 continues traversing the BVH, ultimately arriving at one of the split bounding volumes that does meet the criterion, and thus traversing to the instance. It can be seen that for a single BVH traversal for a ray, application of the instance traversal limiting criterion described above limits the number of times that the ray tracing pipeline 300 traverses to the instance.

In various examples, the instance traversal limiting criterion is that the split bounding volume is the closest to the ray origin, is the farthest from the ray origin, or meets some other criterion. The example in which the criterion is that the split bounding volume is the closest to the ray origin is now described.

Referring to the example of FIG. 7, the ray 720 intersects split bounding volume 712(1) and split bounding volume 712(3). In an example, the ray tracing pipeline traverses the BVH to the non-leaf node 502 that includes a reference to the instance, where the reference is associated with the split bounding volume 712(1). The ray tracing pipeline 300 determines that this split bounding volume 712(1) is the closest to the origin of the ray split bounding volume 712 among all split bounding volumes 712 along the path of the ray 720. Thus, the ray tracing pipeline 300 proceeds to the instance as a result of determining that the ray 720 intersects the split bounding volume 712(1).

Still referring to the example of FIG. 7, the ray tracing pipeline 300 traverses the BVH to the non-leaf node 502 that includes a reference to the instance, where the reference is associated with the split bounding volume 712(3). Upon determining that the ray intersects the split bounding volume 712(3), the ray tracing pipeline 300 determines that the split bounding volume 712(3) is not the closest split bounding volume 712 to the origin of the ray 721 out of the split bounding volumes 712 of the instance along the path of the ray 720. In response to this determination, the ray tracing pipeline 300 does not traverse into the instance, even though the ray 720 intersects the overall bounding volume 702 of the instance.

There are a number of possible ways in which the ray tracing pipeline 300 determines that a particular split bounding volume 712 is the closest split bounding volume to the origin of the ray 720. In one example, the ray tracing pipeline 300 simply tests the ray 720 against all split bounding volumes 712 of the instance and determines whether the split bounding volume 712 at issue (e.g., the split bounding volume 712 that initially triggered the ray tracing pipeline 300 to determine whether to traverse to the instance) is the closest split bounding volume 712 to the origin of all such split bounding volumes that the ray 720 intersects.

In another example, the ray tracing pipeline utilizes empty portions 714 associated with the instance to make the above determination. More specifically, the ray tracing pipeline 300 produces a distance of entry and a distance of exit in the course of testing the ray 720 for intersection with a bounding box. To determine whether a particular split bounding volume 712 (the "bounding volume at issue") is the closest to the origin 721, the ray tracing pipeline 300 determines the distance of entry of the ray into the split bounding volume 712 and also determines the distance of entry of the ray into the empty space boxes 714 (which are also treated as the same type of bounding box and thus result in the same information when tested against the ray for intersection, such as distance of entry and distance of exit) and the distance of exit of the ray into the empty space boxes. Based on this information, the ray tracing pipeline 300 determines whether the entire span of the ray from entry into the overall bounding box 702 to the point of entry into the split bounding volume 712 at issue passes through empty space boxes 714. If the entire span passes through empty space boxes 714, then none of that span passes through a different split bounding volume 712, and thus the bounding volume 712 at issue is the closest to the origin 721 out of all such bounding volumes 712. Put differently, in this example, in some implementations, the instance traversal limiting criterion is satisfied in the event that there is a set of empty space boxes 714 for the instance for which: (1) the distance of entry into the overall bounding box 702 is equal to the distance of entry into one of the empty space boxes 714 in the set; (2) each such empty space box 714 has a distance of entry equal to either the distance of entry of the overall bounding box 702 or the distance of exit of another one of the empty space boxes 714 of the set; and (3) one such empty space box 714 has a distance of exit equal to the distance of entry of the bounding volume at issue.

Figure 8:
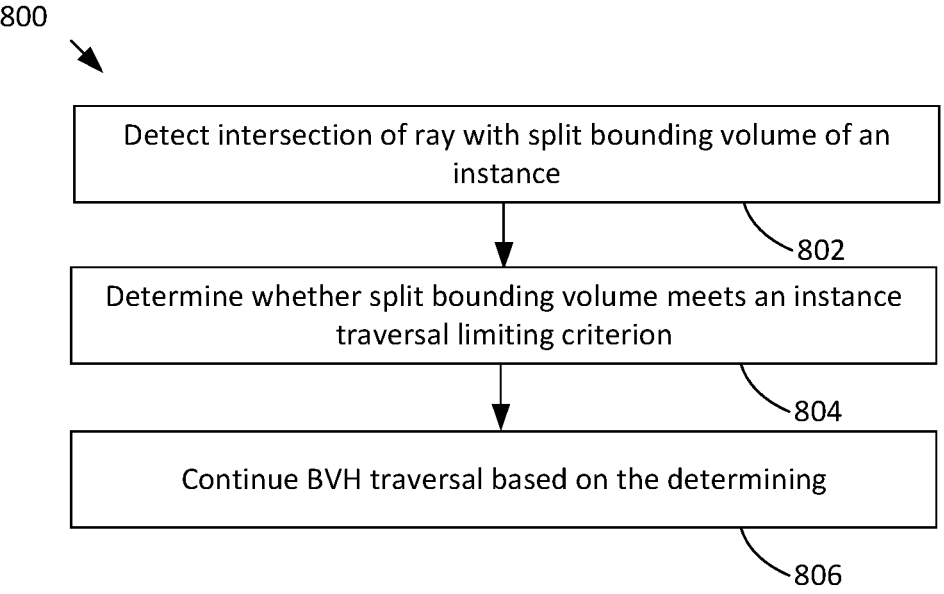
FIG. 8 is a flow diagram of a method for performing ray tracing operations, according to an example.

FIG. 8 is a flow diagram of a method 800 for performing ray tracing operations, according to an example. Although described with respect to the system of FIGS. 1-7, those of skill in the art will understand that any system configured to perform the steps of the method 800 in any technically feasible order falls within the scope of the present disclosure.

At step 802, the ray tracing pipeline 300 detects intersection of a ray with a split bounding volume 712 of an instance. As described elsewhere herein, the present disclosure contemplates a bounding volume hierarchy in which it is possible for there to be multiple references to a single instance. Step 802 includes making a determination that the ray intersects with a split bounding volume of such an instance.

At step 804, the ray tracing pipeline 300 determines whether the split bounding volume meets an instance traversal limiting criterion. As described elsewhere herein, in some implementations, ray tracing APIs require that, for a particular BVH traversal for a particular ray, any particular instance is traversed into only once. Because the present disclosure allows for multiple references to a single instance, it is possible, without the limits described herein, for traversal to an instance to occur multiple times for a single BVH traversal for a ray. Thus, a limiting criterion is applied to ensure that an instance is traversed to only one time even if traversal through the BVH actually ends up at the instance multiple times. As described elsewhere herein, the timing criterion can be any technically feasible criterion that limits traversal to an instance to one time for a given ray. In an example, the criterion is whether the split bounding box encountered is the closest to the origin of the ray. Example techniques for making that determination are described herein. It is possible to use different limiting criteria, as long as the criterion used limits the number of traversals into an instance as appropriate (e.g., to one time per ray).

At step 806, the ray tracing pipeline 300 continues traversal of the BVH for the ray based on the determining of step 804. In an example, in the event that the instance traversal limiting criterion is met, the ray tracing pipeline 300 traverses into the referenced instance. In the event that the instance traversal limiting criterion is not met, the ray tracing pipeline 300 does not traverse into the referenced instance. It should be understood that in some situations in which the instance traversal limiting criterion prevents traversal into an instance, the ray tracing pipeline 300 continues traversal through the BVH to a different reference to the same instance, which has a different split bounding volume. The different reference can be in the same non-leaf node or a different non-leaf node as the non-leaf that includes the reference for which the criterion failed as described above. The ray tracing pipeline 300 would then perform steps 802 and 804 for that different reference, traversing to or not traversing to the instance based on the evaluation of the instance traversal limiting criterion. Overall, in such an example, the ray tracing pipeline 300 would traverse to the instance one time for the entire BVH traversal even if the ray tracing pipeline 300 encounters multiple references to the same instance.

It should be understood that, for a BVH that includes an instance having split bounding volumes, all of the split bounding for a particular instance will be represented by that BVH. In other words, there will be some combination of non-leaf nodes having references to the instance via split bounding volumes where the combination of the split bounding volumes of such non-leaf nodes bounds all underlying geometry of the instance. Put differently, in a particular BVH, any given instance with split bounding volumes has those split bounding volumes distributed among the non-leaf nodes of that BVH such that all such split bounding volumes are included in the BVH.

Each of the units illustrated in the figures represent hardware circuitry configured to perform the operations described herein, software configured to perform the operations described herein, or a combination of software and hardware configured to perform the steps described herein. For example, the ray tracing pipeline 300, ray generation shader 302, any hit shader 306, miss shader 312, closest hit shader 310, and acceleration structure traversal stage 304 are implemented fully in hardware, fully in software executing on processing units (such as compute units 132), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:

detecting intersection of a ray with a split bounding volume of an instance of a bounding volume hierarchy, wherein the bounding volume hierarchy includes multiple nodes, each of which references a different split bounding volume of the instance, and wherein the instance comprises a combination of a bottom-level bounding volume hierarchy and an instance transform;

continuing BVH traversal based on whether the split bounding volume meets an instance traversal limiting criterion, wherein the instance traversal limiting criterion comprises a condition that limits traversal for instances to one time per ray, wherein continuing the BVH traversal comprises: if the instance traversal limiting criterion is met, then traversing into the instance, and if the instance traversal limiting criterion is not met, then skipping traversal into the instance; and rendering an image based on the detecting and continuing.

2. The method of claim 1, wherein:

the bounding volume hierarchy includes an instance node associated with a plurality of split bounding volumes including the split bounding volume; and the plurality of split bounding volumes is split between references of one or more non-leaf nodes of the bounding volume hierarchy, wherein each of the references refers to the instance.

3. The method of claim 2, wherein the total volume encompassed by the plurality of split bounding volumes bounds all underlying geometry of the instance.

4. The method of claim 1, wherein the instance traversal limiting criterion comprises a criterion determined by whether the split bounding volume is closest to an origin of the ray out of all split bounding volumes corresponding to the instance.

5. The method of claim 4, wherein determining whether the criterion is met comprises determining whether, for the entire span from entry of the ray into an overall bounding volume for the instance to entry of the ray into the split bounding volume, there is empty space.

6. The method of claim 1, wherein the bottom-level bounding volume hierarchy is pointed to by multiple instances of the bounding volume hierarchy.

7. The method of claim 1, wherein the instance transform specifies how to transform a ray when entering the bottom-level bounding volume hierarchy.

8. A system comprising:
a memory storing a bounding volume hierarchy; and
a processor configured to perform operations comprising:
    detecting intersection of a ray with a split bounding volume of an instance of the bounding volume hierarchy, wherein the instance comprises a combination of a bottom-level bounding volume hierarchy and an instance transform, and wherein the bounding volume hierarchy includes multiple nodes, each of which references a different split bounding volume of the instance;
    continuing BVH traversal based on whether the split bounding volume meets an instance traversal limiting criterion, wherein the instance traversal limiting criterion comprises a condition that limits traversal for instances to one time per ray,
    wherein continuing the BVH traversal comprises: if the instance traversal limiting criterion is met, then traversing into the instance, and if the instance traversal limiting criterion is not met, then skipping traversal into the instance; and
    rendering an image based on the detecting and continuing.

9. The system of claim 8, wherein:
the bounding volume hierarchy includes an instance node associated with a plurality of split bounding volumes including the split bounding volume; and
the plurality of split bounding volumes is split between references of one or more non-leaf nodes of the bounding volume hierarchy, wherein each of the references refers to the instance.

10. The system of claim 9, wherein the total volume encompassed by the plurality of split bounding volumes bounds all underlying geometry of the instance.

11. The system of claim 8, wherein the instance traversal limiting criterion comprises a criterion determined by whether the split bounding volume is closest to an origin of the ray out of all split bounding volumes corresponding to the instance.

12. The system of claim 11, wherein determining whether the criterion is met comprises determining whether, for the entire span from entry of the ray into an overall bounding volume for the instance to entry of the ray into the split bounding volume, there is empty space.

13. The system of claim 8, wherein the bottom-level bounding volume hierarchy is pointed to by multiple instances of the bounding volume hierarchy.

14. A non-transitory computer-readable medium storing instructions that, when executed, cause a processor to perform operations comprising:

detecting intersection of a ray with a split bounding volume of an instance of a bounding volume hierarchy, wherein the instance comprises a combination of a bottom-level bounding volume hierarchy and an instance transform, and wherein the bounding volume hierarchy includes multiple nodes, each of which references a different split bounding volume of the instance;

continuing BVH traversal based on whether the split bounding volume meets an instance traversal limiting criterion, wherein the instance traversal limiting criterion comprises a condition that limits traversal for instances to one time per ray, wherein continuing the BVH traversal comprises: if the instance traversal limiting criterion is met, then traversing into the instance, and if the instance traversal limiting criterion is not met, then skipping traversal into the instance; and rendering an image based on the detecting and continuing.

15. The non-transitory computer-readable medium of claim 14, wherein:
the bounding volume hierarchy includes an instance node associated with a plurality of split bounding volumes including the split bounding volume; and
the plurality of split bounding volumes is split between references of one or more non-leaf nodes of the bounding volume hierarchy, wherein each of the references refers to the instance.

16. The non-transitory computer-readable medium of claim 15, wherein the total volume encompassed by the plurality of split bounding volumes bounds all underlying geometry of the instance.

17. The non-transitory computer-readable medium of claim 14, wherein the instance comprises a combination of a bottom-level bounding volume hierarchy and an instance transform.

18. The non-transitory computer-readable medium of claim 14, wherein the instance traversal limiting criterion comprises a criterion determined by whether the split bounding volume is closest to an origin of the ray out of all split bounding volumes corresponding to the instance.

19. The non-transitory computer-readable medium of claim 18, wherein determining whether the criterion is met comprises determining whether, for the entire span from entry of the ray into an overall bounding volume for the instance to entry of the ray into the split bounding volume, there is empty space.

20. The non-transitory computer-readable medium of claim 14, wherein the bottom-level bounding volume hierarchy is pointed to by multiple instances of the bounding volume hierarchy.

* * * * *